(12) United States Patent
Frutschi

(10) Patent No.: US 6,463,741 B1
(45) Date of Patent: Oct. 15, 2002

(54) METHOD FOR OPERATING A POWER PLANT

(75) Inventor: Hans Ulrich Frutschi, Riniken (CH)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 09/702,896

(22) Filed: Nov. 1, 2000

(30) Foreign Application Priority Data

Nov. 3, 1999 (DE) .......................... 199 52 885

(51) Int. Cl.⁷ .............................. F02C 3/28; F02C 6/18
(52) U.S. Cl. ...................... 60/780; 60/39.12; 60/39.182
(58) Field of Search ............... 60/39.02, 39.12, 60/39.182, 778, 772, 780

(56) References Cited

U.S. PATENT DOCUMENTS

| | | | | |
|---|---|---|---|---|
| 5,044,152 A | * | 9/1991 | Hoizumi et al. ......... | 60/39.182 |
| 5,590,518 A | * | 1/1997 | Janes ....................... | 60/39.12 |
| 5,628,183 A | * | 5/1997 | Rice et al. ............... | 60/39.182 |
| 5,669,216 A | * | 9/1997 | Ankersmit et al. ....... | 60/39.12 |
| 5,705,916 A | | 1/1998 | Rudbeck et al. | |
| 5,737,912 A | * | 4/1998 | Krakowitzer ............ | 60/39.182 |
| 5,740,667 A | * | 4/1998 | Bhattacharyya et al. .. | 60/39.12 |
| 5,881,549 A | | 3/1999 | Janes | |
| 5,881,551 A | * | 3/1999 | Dang ...................... | 60/39.182 |
| 5,927,063 A | | 7/1999 | Janda et al. | |

FOREIGN PATENT DOCUMENTS

| | | |
|---|---|---|
| DE | 40 03 210 | 8/1991 |
| EP | 0 646 705 | 4/1995 |
| GB | 2 232 721 | 12/1990 |

* cited by examiner

*Primary Examiner*—Ted Kim
(74) *Attorney, Agent, or Firm*—Burns, Doane, Swecker & Mathis, L.L.P.

(57) ABSTRACT

A gas turbine set with sequential combustion is provided with a waste-heat boiler suitable for the generation of synthesis gas. The gas turbine set then operates with chemical recouperation of the exhaust-gas heat. By means of such a power plant, efficiencies can be achieved which come close to those of combined cycle plants. The highest efficiencies are achieved when, in a gas turbine set with sequential combustion, the reactor gas is fired, for as large a part as possible, in a combustion chamber of a highest pressure stage. In order to achieve a particular rate of conversion of hydrocarbon-containing crude fuel and superheated steam into synthesis gas, the reactor has to be brought to a minimum temperature which may be above the temperature of the expanded working medium of the gas turbine. This temperature increase can be ensured by means of additional firing. The additional firing may also be used for starting the production of synthesis gas when a starting-air device is present.

10 Claims, 3 Drawing Sheets

METHOD FOR OPERATING A POWER PLANT

This application claims priority under 35 U.S.C. §119 and/or 365 to Appln. No. 199 52 885.3 filed in Germany on Nov. 3 1999; the entire content of which is hereby incorporated by reference.

FIELD OF THE INVENTION

The invention relates to a method for operating a power plant, which contains a gas turbine set.

BACKGROUND OF THE INVENTION

It is known to utilize the high exhaust-gas temperatures of gas turbine sets for the generation of synthesis gas. In this context, water is evaporated in a waste-heat boiler by means of the exhaust-gas heat of the gas turbine set. The steam thus obtained is intermixed, in a reactor likewise heated by the exhaust gas of the gas turbine, with a hydrocarbon-containing crude fuel, for example natural gas. When the temperature is sufficiently high, a low-calorie synthesis gas is obtained in the reactor from the crude fuel and the steam and contains as essential constituents the components comprising steam, hydrogen, unconverted crude fuel, carbon dioxide and carbon monoxide. A reactor gas emerges from the reactor, which reactor gas consists, in a varying composition, of synthesis gas, crude fuel and unconsumed steam and which can be burnt in a combustion chamber of the gas turbine set. The combustion of such low-calorie gases affords advantages in terms of pollutant emissions, in particular of nitrogen oxides, since the flame temperatures are lower. The high hydrogen fraction at the same time ensures stable combustion. The large fraction of ballast materials in the reactor gas results in high fuel mass flows and therefore high specific power outputs of the gas turbine set.

Power plants of this type with chemical recuperation of the exhaust-gas heat offer high efficiencies. However, a thorough conversion of crude fuel and steam into synthesis gas requires a comparatively high temperature level. This is afforded, at least approximately, precisely in the exhaust gas of modern gas turbine sets with sequential combustion which have a plurality of combustion chambers at different pressure stages. Additional firing upstream of the waste-heat boiler which may be necessary in some cases in order to achieve the necessary reactor temperature can have small dimensions. This makes the practical use of chemical recuperation of the exhaust-gas heat in gas turbine sets with sequential combustion attractive.

SUMMARY OF THE INVENTION

The object on which the present invention is based, in a power plant in which the exhaust-gas heat of a gas turbine set is utilized for the generation of synthesis gas, is to utilize in the best possible way the potentials of such an operation method for efficiency and power output.

It is therefore proposed, according to the invention, that a method for operating a power plant, which power plant contains at least one gas turbine set with at least one combustion chamber of a highest pressure stage and with at least one combustion chamber of at least one lower pressure stage, and in which method a hot gas is first expanded from a combustion chamber of a high pressure stage in a turbine, at the same time delivering mechanical power, and is introduced into a combustion chamber of a lower pressure stage, an expanded hot gas of the gas turbine set flowing through a waste-heat boiler, in which waste-heat boiler a steam quantity is generated, this steam quantity being introduced into a reactor installed in the waste-heat boiler, into which reactor a quantity of a hydrocarbon-containing crude fuel continues to be introduced, and a reactor gas consisting at least partially of synthesis gas being generated in the reactor from the steam quantity and from the crude fuel, which reactor gas is burnt at least partially in at least one combustion chamber of the gas turbine set, be designed in such a way that the synthesis gas is introduced, at least for a predominant part, into a combustion chamber of as high a pressure stage as possible and is burnt there. Combustion chambers of lower pressure stages are fired preferably directly by means of the crude fuel.

The essence of the invention is, therefore, in a power plant with a waste-heat boiler, to design the waste-heat boiler initially in a way known per se as a reactor for the generation of synthesis gas. Modern gas turbine sets with sequential combustion, which have at least two combustion chambers operating at different pressures, are particularly suitable for the generation of synthesis gas in a waste-heat boiler because of the high exhaust-gas temperatures which can be achieved. Steam is generated in the waste-heat boiler and is combined with a hydrocarbon-containing crude fuel in a reactor heated by the exhaust gas. A reactor gas is obtained there, which, when the reactor temperature is sufficiently high, consists essentially of hydrogen, carbon dioxide, carbon monoxide and steam not consumed for the generation of synthesis gas and, when the reactor temperature is comparatively low, of unconverted crude fuel, the inert steam constituting a ballast component of the reactor gas. According to the invention, in a gas turbine set with sequential combustion, the reactor gas is introduced, at least for a large part, into the combustion chamber of the highest pressure stage, insofar as the gas quantity is capable of being converted there. Combustion chambers of low pressure stages are operated preferably directly by means of a crude fuel which does not necessary have to be identical to the crude fuel supplied to the reactor for the generation of synthesis gas, but in the majority of cases will be because of practical considerations. The entire generated reactor gas quantity is introduced preferably into the combustion chamber of highest pressure and is burnt there, as long as the production rate of the reactor gas does not exceed the gas quantity capable of being utilized in the combustion chamber of highest pressure. The reactor gas is thus introduced at the highest possible pressure into the working process of the gas turbine set. The efficiency of a power plant with chemical recuperation of the exhaust-gas heat which is operated according to the invention far exceeds that of a power plant with steam injection and comes very close to that of a combined cycle plant in which the apparatus is appreciably more complicated.

Optimization of the efficiency of a chemically recuperated gas turbine set with sequential combustion is therefore achieved, with the exhaust-gas heat utilized as fully as possible, the generated reactor gas is burned as far as possible in the combustion chamber of the highest pressure stage. When, for example, methane or natural gas with a high methane content is used as crude fuel, it proves beneficial, in this respect, if possible to set the variable mass ratio of steam and crude fuel at a value of 5 parts of steam to one part of methane. When the hot-gas temperature in the combustion chamber of the highest pressure stage reaches a specific limit value, which is determined', for example, by the permissible material temperatures of the components in the hot-gas path or, by the operating concept of the gas turbine plant, no further fuel can be utilized in the combustion chamber of the highest pressure stage. Reactor gas generated beyond the quantity capable of being utilized in the combustion chamber of the highest pressure stage is introduced into a combustion chamber of a lower pressure stage, preferably into a combustion chamber of the next lower pressure stage, and is burned there. Thus, in a further operating state, the combustion chambers of the two highest pressure stages are operated with reactor gas, specifically the combustion chamber of the highest pressure stage exclusively or for a predominant part and the combustion chamber of the second highest pressure stage for the fraction to be covered by the production of reactor gas and for the rest with crude fuel, while, where appropriate, further combustion chambers of lower pressure stages are operated at least predominantly with the crude fuel so as to operate with optimum efficiency. Reactor gas which can no longer be utilized even in the combustion chamber of the second highest pressure stage may, if present, be utilized in a combustion chamber of a third highest pressure stage. In this way, an increasing production of reactor gas is supplied in stages, at an ever lower pressure, to the working process of the gas turbine plant, and a maximum fraction of the generated reactor gas is always used at the highest pressure stages. There are, of course, limits regarding the capability of using the reactor gas for operating the gas turbines set. When more reactor gas is generated overall than can be burned in the combustion chambers of the gas turbine set at a given power output of the power plant, the excess reactor gas can also be utilized for operating other firing plants. However, along the lines of the actual idea of the invention, this option should be utilized,, in fact, only when a high reactor gas production made possible by the exhaust-gas heat can, in fact, no longer be utilized within the actual working process of the gas turbine set. The highest efficiency of the power plant is achieved, in fact, when the reactor gas produced with the exhaust-gas heat being fully utilized can be burned completely in the combustion chamber of the highest pressure stage, and the teaching of the present invention is also to be seen primarily in this. All the above, described diversions of reactor gas into lower pressure stages are to be considered as secondary, and, with a view to efficiency optimization, the aim must always be for the generated reactor gas to be converted as completely as possible in the combustion chamber of the highest pressure stage.

This process management is also to be preferred for reasons of reaction kinetics. In a gas turbine set with sequential combustion, the greatest temperature increase usually occurs in the first combustion chamber, that is to say the combustion chamber of highest pressure. The high heat release rate results in a high potential for the formation of nitrogen oxides. In the combustion of the low-calorie reactor gas with high ballast fractions, local temperature peaks are effectively prevented, thus leading to combustion low in nitrogen oxides. At the same time, a high hydrogen fraction in the synthesis gas fraction of the reactor gas contributes very decisively to stabilizing the comparatively cool flame. By contrast, in the combustion chambers of lower pressure stages, the working medium is simply reheated. Due to the comparatively low temperature increase, the formation of nitrogen oxides in these combustion chambers is in any case only slight. Moreover, such combustion chambers are often designed as self-ignition combustion chambers. That is to say, the ignitability of the fuel used must be sufficiently high to ensure that spontaneous self ignition of the fuel takes place in the hot gas. Low-calorie reactor gas with high fractions of carbon monoxide and of inert gases does not readily ensure this; in this case a pilot flame may have to be generated by means of a highly ignitable fuel, such as diesel oil, in order to ensure reliable self ignition of the reactor gas.

The operating method according to the invention also offers advantages precisely when the power plant is to be operated with liquid crude fuels for reasons of availability. It is known that, without appropriate measures, the production of nitrogen oxides is substantially greater in operations with liquid fuels than in operations with gaseous fuels. It proves advantageous, in this case, to process part of the crude fuel into synthesis gas which is burnt as the sole fuel in the combustion chamber of the highest pressure stage. In this way, as described above, in a combustion chamber of the highest pressure stage, which, in the case of the gas turbine sets with sequential combustion actually used nowadays, has the highest thermal power output at temperature increases beyond 700° C., a low-calorie gaseous fuel is burnt, this having the positive effect described on the formation of nitrogen oxides. A combustion chamber of a lower pressure stage is fired at a comparatively appreciably lower level; the temperature increases are restricted, for example, to 200° C. On account of the markedly low thermal power output, the tendency of the atmospheric nitrogen to oxidate is only slight, and because of this, even in the case of firing with liquid fuel, such high production rates of atmospheric pollutants do not occur. Furthermore, the use of highly ignitable fuels, such as diesel oil, is advantageous precisely in a self-ignition sequential combustion chamber of the well-known type. In an operating method according to the invention, therefore, a power plant can be operated with a single crude fuel and fuels of the kind suitable in each case are nevertheless employed at different points. Precisely for the operating mode described above, it is highly beneficial if, as described below, additional firing is operated in the waste-heat boiler, in order to ensure a sufficient synthesis of reactor gas from the liquid fuel in the entire operating range. To be precise, in this case, the crude fuel can be converted to 100% into synthesis gas under all circumstances.

It must be stated, in summary, that as full a utilization as possible of the reactor gas in the combustion chamber of the highest pressure stage, normally the first combustion chamber, of a gas turbine set with sequential combustion is to be preferred on account of thermodynamic considerations and questions of reaction kinetics.

In part-load operation and, in particular, during the startup of a chemically recuperated gas turbine set, operating states will arise in which the available exhaust-gas heat is not sufficient to generate a reactor gas quantity sufficient for operating the combustion chamber of the highest pressure and having a desired synthesis gas content. In this case, the combustion chamber of the highest pressure must be fired directly, at least partially, with the crude fuel. With an increasing production of synthesis gas, the crude fuel is replaced successively by synthesis gas. It should also be stated that not only the overall availability of heat quantity from the exhaust-gas heat is critical for the production of reactor gas, but a minimum temperature is also necessary in order to generate synthesis gas. Consequently, for carrying out the method according to the invention, a gas turbine set is advantageously used which has at least one adjustable row of compressor blades, in particular an adjustable preguide row. By virtue of the adjustment of the compressor blading, the mass flow of the working medium of the gas turbine set can be varied within a particular range, and therefore also the exhaust-gas temperature upon exit from the gas turbine and upon entry into the waste-heat boiler. When the method according to the invention is carried out, adjustable compressor blades can be used in such a way as to regulate the exhaust-gas temperature in part-load operation to a target value such that, even when the load of the power plant is low, a specific exhaust-gas temperature conducive to the production of synthesis gas is reached.

The desired reactor temperature and therefore the desired temperature of the exhaust gas upon entry into the waste-heat boiler are determined by the desired degree of conversion of the crude fuel into synthesis gas. In synthesis gas reactors which are conventional according to the prior art, a substantial conversion of, for example, methane is achieved only at temperatures beyond approximately 850° C. However, such high temperatures in the exhaust gas of a gas turbine set would lead to considerable strength problems in the region of the last rows of turbine moving blades. If, therefore, it is desirable to have as complete a conversion as possible of the crude fuel into synthesis gas, for example, in the above-described operating method with diesel oil as crude fuel, it is necessary to use additional firing in the exhaust-gas path upstream of the waste-heat boiler in order to raise the reactor temperature. Even if additional firing may lead to slight losses in the efficiency of the plant as a whole, this can be more than compensated for by operational benefits. As described above, additional firing may afford considerable advantages precisely during the startup and in the lower part-load range of the power plant, but, irrespective of the exhaust-gas temperature of the gas turbine, a specific reactor temperature can be ensured. Furthermore, additional firing may be utilized in order to carry out a quick-reacting regulation of the reactor temperature, in particular in transient operating states with fluctuations of the exhaust-gas temperature.

When additional firing is employed during the startup of the power plant, that is to say the gas turbine set is still at a standstill or at a very low rotational speed, it is necessary to introduce air into the exhaust-gas tract of the gas turbine upstream of the additional firing. For this purpose, when the power plant is being started up, an additional-air flap is opened, and an additional-air blower conveys ambient air to the additional firing and from there into the waste-heat boiler.

The optimization of the efficiency of the overall plant necessitates, of course, as full a utilization of the exhaust-gas heat as possible. The exhaust gas is therefore to be cooled, upon exit from the waste-heat boiler, to a lower limit temperature which is determined, for example, by the dew point of exhaust-gas components. In order to set the exhaust-gas final temperature at this target value, it proves expedient, in particular, to vary the steam quantity degenerated in the waste-heat boiler. In this case, it is particularly advantageous that the ballast content, that is to say, in particular, the steam content of the generated reactor gas can be varied within wide ranges and may reach comparatively high values. It is therefore perfectly possible, for example when methane is used as crude fuel, to supply four or even five times the quantity of steam to the reactor when this is expedient for utilizing the exhaust-gas heat as effectively as possible. In other words, the utilization of the exhaust-gas heat can be influenced, on the one hand, by a control of the quantity of the generated reactor gas and, on the other hand, by a control of the reactor gas quality. Furthermore, it is, of course, also possible not to utilize part of the steam generated in the waste-heat boiler for the generation of reactor gas, but instead to supply this steam to other consumers. Thus, excess steam can be introduced into the gas turbine process at a suitable point and be used for cooling components of the gas turbine set which are subjected to high thermal load, or it could even be utilized in a steam turbine.

The above-described variation of the quantity supplied to the reactor in relation to the quantity of the crude fuel and the possibility of influencing the rate of conversion of the crude fuel into synthesis gas via the reactor temperature afford wide-ranging possibilities of setting in a controlled manner fuel parameters, such as the calorific value or the flame front velocity of the reactor gas, as required.

The explanations show that the method according to the invention makes it possible to have an entire series of embodiments. The selection of a specific variant will depend, in practice, to a great extent on the desired operating mode and the available crude fuel and also on thermodynamic boundary conditions predetermined by the gas turbine set to be used. The fundamental inventive idea common to all the variants is to fire the reactor gas as completely as possible in a combustion chamber of a highest pressure stage for the purpose of maximum exergy utilization.

DESCRIPTION OF THE DRAWINGS

Preferred embodiments of the invention are described herein with reference to the accompanying drawings, in which.

DETAILED DESCRIPTION OF THE INVENTION

Figure 1:
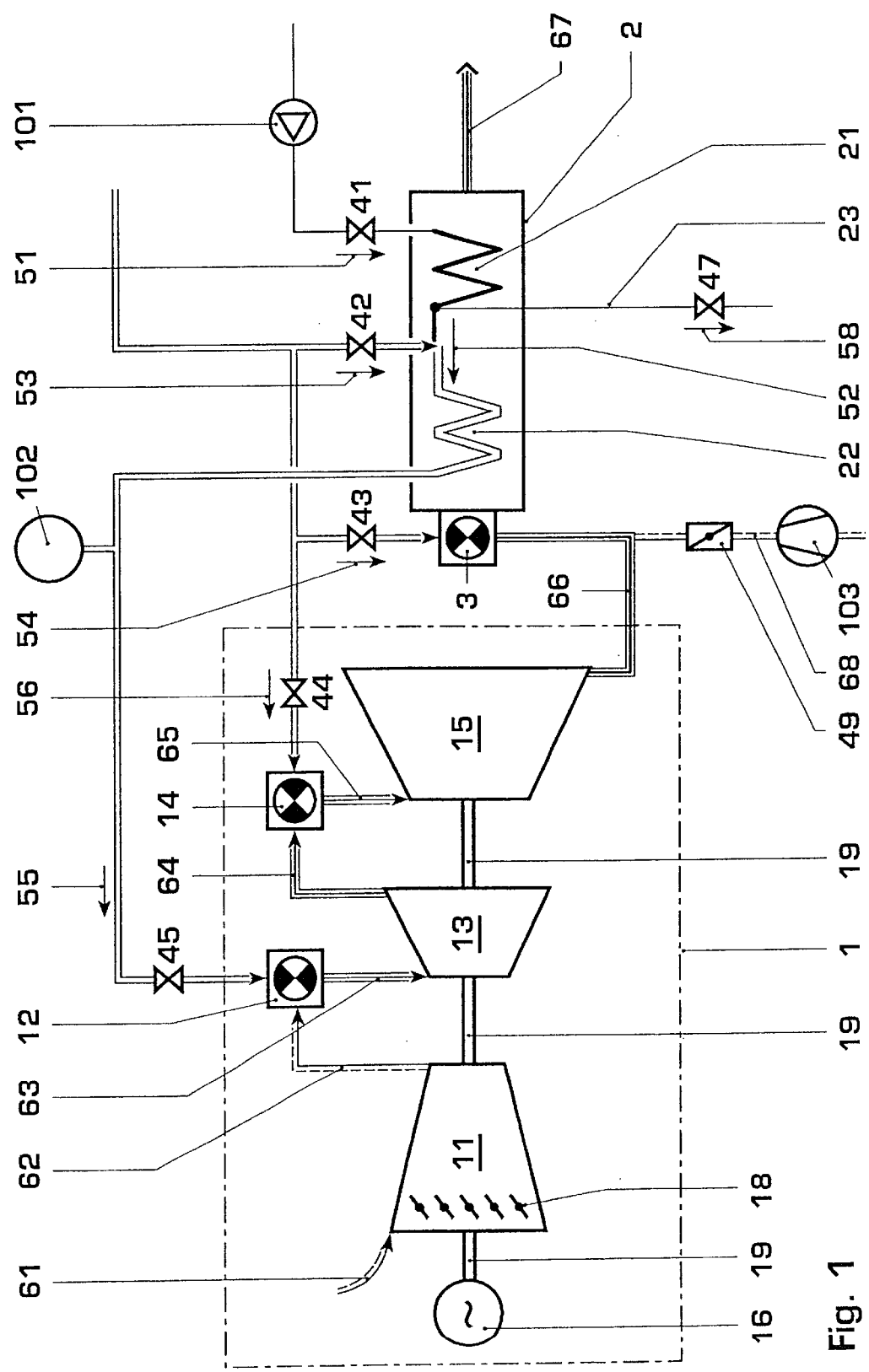
FIG. 1 is a schematic diagram of the power plant in accordance with this invention.

FIG. 1 shows a gas turbine set 1 with sequential combustion, such as is known per se, for example, from EP 0 620 362, the disclosure of which is incorporated herein by reference. A compressor 11, a first turbine 13, a second turbine 15 and a generator 16 are arranged on a common shaft 19. The compressor 11 sucks in an air quantity 61 from the surrounding and compresses this air quantity to a high pressure. Compressed combustion air 62 flows out of the compressor 11 into a combustion chamber of a highest pressure stage 12. A fuel is admixed with the air and burnt there. A hot gas 63 flows out of this first combustion chamber into a first turbine 13 and is partially expanded. The turbine 3 is designed, for example, for a pressure ratio into the region of 1.5 or 2. Partially expanded working medium 64 with a temperature which is still very high flows into a second combustion chamber 14 of a lower pressure stage. Further fuel is supplied there and burned, and the working medium is heated once again. This reheated hot gas 65 of a lower pressure stage flows into a second turbine 15 and is expanded there approximately to ambient pressure. Precisely when the second combustion chamber 14 is in operation, the expanded working medium 66 flowing out of the turbine 15 is till at a very high temperature. This exhaust-gas heat is utilized in a waste-heat boiler 2.

In the example, additional firing 3 is arranged at an upstream end of the waste-heat boiler 2. The exhaust gas 67 flowing out of the waste-heat boiler is at as low a temperature possible, so that the exhaust-gas heat is utilized to the maximum. In practice, the temperature of the exhaust gas 67 upon exist from the waste-heat boiler 2 is restricted downward by factors, such as the dew point of exhaust-gas components. These factors result in a target value for the temperature of the exhaust gas at the exist from the waste-heat boiler. A steam generator 21 and a reaction 22 are arranged within the waste-heat boiler. In this case, the steam generator 21 is located in that part of the waste-heat boiler 2 which is cold, that is to say is downstream in the direction of flow of the exhaust gas, while the reactor 22 is arranged in the hot upstream part. A feed pump 101 conveys a feed water quantity 51 via a regulating member 41 into the steam generator 21. In this case, the feed water quantity 51 is preferably regulated in such away that the temperature of the exhaust gas 67 upon exit from the waste-heat boiler 2 corresponds to the target value.

A quantity of superheated steam 52 is supplied to reactor 22; furthermore, a part stream 58 of the steam can be extracted from the steam generator 21 via the tapped-steam line 23 and the tapped-steam controlling member 47. This steam quantity can be introduced, for example, at a suitable point into the working medium of the gas turbine set, and it could be used in a way well-known per se for cooling components of the gas turbine set which are subjected to high thermal load, or else it could be used for other purposes, such as process or heating steam or in a steam turbine. A quantity 53 of the hydrocarbon-containing crude fuel, for example methane, natural gas or diesel oil, is also supplied to the reactor. The quantity 53 is set according to requirements by means of the controlling member 42. Steam and crude fuel are intermixed in the reactor 22, and, when the reactor temperature is sufficiently high, a reactor gas with a specific synthesis gas content is generated in a way known per se.

In the power plant illustrated in FIG. 1, the generated reactor gas quantity 55 is fire completely in the combustion chamber 12 of the highest pressure stage, the fired reactor gas quantity being set via the controlling member 45. The regulation o the power output of the gas turbine set leads to brief minor fluctuations in the gas requirement of the combustion chamber 12, and these cannot be compensated directly in the reactor. The production rate of reactor gas is adapted in each case to the fuel requirement of the combustion chamber of the highest pressure stage by the crude fuel quantity 53 supplied to the reactor being varied by means of the controlling member 42. On account of the comparatively long flow paths and the regulating mechanisms, the production rate of the reactor gas cannot always directly follow transient fluctuations in the fuel requirements. A compensating reservoir 102 therefore serves as an intermediate store for reactor gas.

When the gas turbine set is under high load, the combustion chamber 14 is also fired in addition to the combustion chamber 12, specifically with a quantity of crude fuel 56 which is influenced via the controlling member 44. When the gas turbine set is operating under part load, the position of an adjustable preguide row 18 and therefore the mass flow of the working medium of the gas turbine set are regulated in such a way that, even under comparatively low load, a high target value of the exhaust-gas temperature is reached, at which the exhaust-gas heat is utilized efficiently in the waste-heat boiler. For a particular conversion rate of crude fuel 53 and steam 52 in the reactor 22, it is necessary for the reactor to have a specific temperature which is sometimes above the exhaust-gas temperature. For this purpose, additional firing 3 is arranged upstream of the waste-heat boiler, as seen in the direction of flow of the exhaust gas. The quantity of fuel 54 supplied to this additional firing is regulated via a controlling member 43 in such a way that the desired reactor temperature is reached. The additional firing is also important for starting up the gas turbine set directly with reactor gas.

When the gas turbine set is at a standstill or at a low rotational speed, when no fluid or only very little fluid is conveyed from the gas turbine set through the waste-heat boiler, an additional-air flap 49 is opened. For starting up the power plant, an additional-air blower. 103 conveys an additional-air quantity 68 into the exhaust-gas tract of the gas turbine set and from there through the additional firing and the waste-heat boiler.

The operation by which the power plant illustrated is started up could, for example, be as follows: the gas turbine set is first run up to a specific rotational speed with the aid of a starting device for a few minutes for boiler scavenging, until a multiple of the volume of the entire exhaust-gas tract of the gas turbine set, including the boiler, has been conveyed through the gas turbine set. The controlling member 43 can then be opened and the additional firing 3 ignited. In the next step, the additional-air blower 103 is put into operation and the additional-air flap 49 is opened. As result of the additional-air blower 103, the mass flow flowing through the waste-heat boiler is independent of the rotational speed of the gas turbine set. In interaction with the regulation of the flow quantity 54 which is supplied to the additional firing 3, the conditions in the waste-heat boiler are regulated in such a way that the reactor temperature is sufficiently high to generate a reactor gas with a specific content of synthesis gas and the mass flow of the hot gas generated in the additional firing is sufficient to achieve the reactor gas production rate necessary for starting up the gas turbine. In this case, steam flows through the steam generator and the reactor, which is either introduced into the combustion chamber 12 or blown off via a valve C (not illustrated). When the required reactor temperature is reached, the regulating member 42 is opened and the production of synthesis gas starts. The generated reactor gas can be intermediately stored for a moment in the compensating reservoir 102. Alternatively, the first reactor gas generated could also be routed, via a device not illustrated here, to the additional firing and be burned there. In parallel with this, the gas turbine set is run up to its ignition rotational speed, and the controlling member 45 is opened. Reactor gas 55 flows out of the reactor 22 into the combustion chamber 12, and the ignition sequence of the combustion chamber 12 is started. The gas turbine set is thereupon run up in a known way to the nominal rotational speed, synchronized and subjected to load. When the mass flow conveyed through the gas turbine set is sufficient for operating the waste-heat boiler, the additional-air flap 49 is closed and the additional-air blower 103 is switched off. The additional firing 3 is optionally used over the entire operating range, in order to keep the thermal power output capable of being utilized in the waste-heat boiler high enough to produce a sufficient quantity of reactor gas with a specific content of synthesis gas,, said quantity being sufficient for operating the combustion chamber 12, and, on the other hand, in order to keep the reactor temperature at a minimum value necessary for the desired degree of conversion of the crude fuel. In the circuit illustrated in FIG. 1, the reactor gas production has to be set in such a way that, on average, it corresponds exactly to the quantity capable of being utilized in the combustion chamber 12 of the highest pressure stage. Brief fluctuations are compensated for by means of the reservoir 102 and a variable reactor gas composition. The feed water quantity 51 is regulated in such a way that the temperature of the exhaust gas 67 upon exit from the waste-heat boiler corresponds to a lower limit value, as described above, in order to achieve as full a utilization of the exhaust-gas heat as possible. Precisely when the power plant is operated with additional firing, even under high load, there is the possibility that not all the steam mass flow thus generated can be utilized for the generation of reactor gas, because the ballast content of the fuel would be too great or because, with the compressor being at a maximum pressure ratio, the first turbine 13 can otherwise no longer put through the resulting mass flow. Excess steam is extracted via a tapped-steam line 23. The steam quantity 58 extracted there is introduced, for example, at another suitable point into the working medium of the gas turbine set, but may also be used in a steam turbine or as process steam and the like. The method described above is also highly suited to firing liquid fuels as crude fuel.

Figure 2:
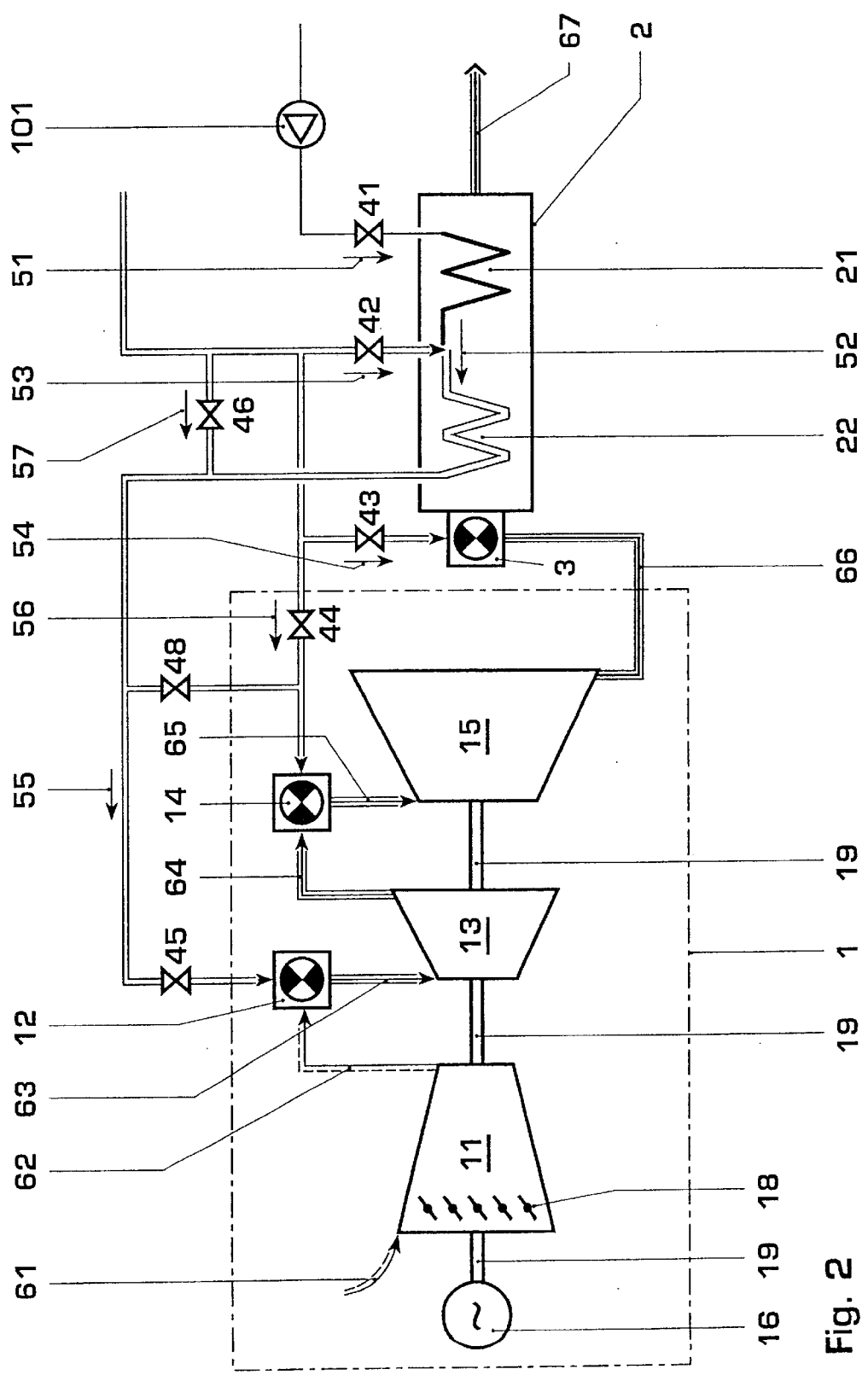
FIG. 2 is a schematic diagram of a first modified embodiment of the power plant of FIG. 1.

In another preferred embodiment, which is shown in FIG. 2, the first combustion chamber is started with crude fuel. Furthermore, a greater quantity of reactor gas can be utilized. A quantity 57 of crude fuel can be introduced directly, bypassing the reactor 22, into the reactor gas line via a bypass valve 46. Moreover, part of the reactor gas can be introduced into a combustion chamber 14 of a lower pressure stage via a controlling member 48. When the power plant is being started up, the controlling members 41, 42, 43, 48 and 44 are closed during the ignition of the gas turbine set. A fuel quantity necessary for ignition is supplied to the combustion chamber 12 of the highest pressure stage via the controlling members 46 and 45. As soon as a hot exhaust gas 66 flows into the waste-heat boiler 2, the controlling member 41 is opened and the feed pump 101 delivers into the boiler a feed water quantity 51 which is sufficient to avoid overheating the heat exchanger tubes in the waste-heat boiler. The steam quantity generated is intermixed with the crude fuel quantity 57 and supplied to the combustion chamber 12. Where this leads to problems of flame stability under low load, the steam may also be blown out via a suitable device which is not illustrated here. The gas turbine set 1 is accelerated to the nominal rotational speed, synchronized and slowly subjected to load. The preguide row 18 of the compressor 11 is closed and minimizes the air quantity 61 sucked in. The temperature of the expanded working medium 66 is consequently maximized for a given load, in order as quickly as possible to reach a temperature of the reactor 22 suitable for the generation of synthesis gas. This may be assisted by supplying a fuel quantity 54 to the additional firing 3 via the controlling member 43. In this case, depending on the operating concept, the fuel quantity 54 is controlled in such a way that a specific reactor temperature, a minimum reactor temperature, a minimum temperature at a specific point within the waste-heat boiler or the like is set. How such an operating concept is selected in an individual case depends inter alia on heat balances, on specific determining data of the gas turbine set or on the crude fuel. For the commencement of the generation of reactor gas, the regulating member 42 is opened and the regulating member 46 is successively closed, the entire fuel quantity consisting, for an increasing part, of reactor gas. Finally, the controlling member 46 is in this case used only for compensating brief fluctuations in the fuel requirement by admixing crude fuel 57 to the reactor gas 55. At a specific load point, the temperature of the hot gas 63 reaches a permissible maximum value upon exit from the combustion chamber 12. For further increase in power output, a crude fuel 56 is supplied to a combustion chamber 14 of a lower pressure stage via the controlling member 44, and the partially expanded working medium 64 is reheated. The temperature of the expanded working medium 66 rises and reaches a maximum permissible value. Thereupon, the preguide row 18 opens and increases the sucked-in air quantity 61. Via the mass flow of the working medium, the preguide row 18 regulates the temperature of the expanded working medium 66 to a permissible maximum value, in order as far as possible to avoid having to fire up by additional firing 3. However, in the embodiment with additional firing, the mass flow through the waste-heat steam generator can be maximized, even under a low load, this being a matter of the selected operating concept, as described briefly above. With an increasing power output of the gas turbine set, the thermal power capable of being utilized in the waste-heat boiler increases,, as a result of which the production rate of reactor gas also increases. As long as the reactor gas quantity 55 can be utilized in the combustion chamber 12 of the highest pressure stage, the controlling member 48 remains closed. Only when more reactor gas is generated, is the controlling member 48 opened and the excess part of the reactor gas utilized in the combustion chamber 14 of the next lower pressure stage.

Figure 3:
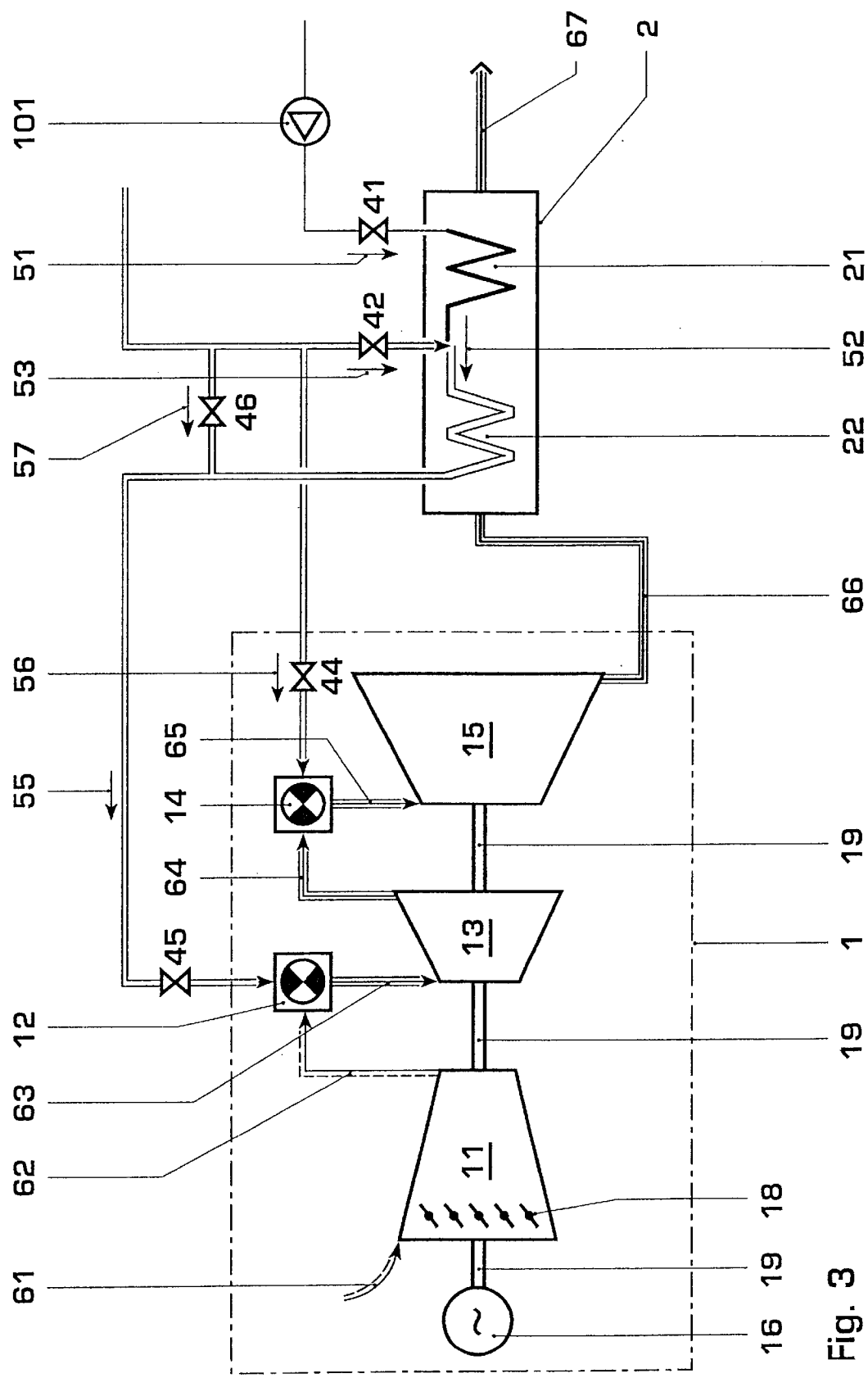
FIG. 3 is a schematic diagram of a second modified embodiment of the power plant of FIG. 1.

A power plant having particularly simply apparatus for carrying out the method according to the invention is illustrated in FIG. 3. Additional firing is dispensed with here. The entire fuel requirement of the combustion chamber 12 of the highest pressure state is regulated by the controlling member 45. The controlling member 42 conducts a quantity 53 of crude fuel into the reactor 2 as a function of the reactor gas production which can be achieved. If the gas quantity flowing through the reactor is not sufficient for operating the combustion chamber 12, the controlling member 46 regulates a fuel quantity 57, which, bypassing the reactor, is introduced into the combustion chamber 12, in such a way that the total quantity 55 corresponds to the requirement of the combustion chamber 12.

When, as is the case in the examples illustrated in FIGS. 2 and 3, a combustion chamber is to be operated with fuels of widely differing calorific value, this may lead to problems. This is avoided in the example from FIG. 1, since the combustion chamber of the highest pressure stage is operated solely with reactor gas and the combustion chamber of the lower pressure stages solely with crude fuel.

When, as is the case in the examples illustrated in FIGS. 2 and 3, a combustion chamber is to be operated with fuels of widely differing calorific value, this may lead to problems. This is avoided in the example from FIG. 1, since the combustion chamber of the highest pressure stage is operated solely with reactor gas and the combustion chamber of the lower pressure stages solely with crude fuel.

As can be seen from the exemplary embodiments, the operating mode according to the invention of a chemically recouperated gas turbine makes it possible to have a large number of method variants. The specific variants indicated in the examples illustrated may also be combined with one another in a completely different way from that illustrated. It is the task of a person skilled in the art, with the aid of his specialized knowledge, and in light of a specific desired efficiency, the cost constraints, the available components and a series of other factors specific to the project, to determine the appropriate combinations and to select one which is specifically the most suitable. It is critical, and essential to the invention, that, in order to maximize efficiency, the generated reactor gas be burnt as completely as possible in a combustion chamber of a highest pressure stage. When the generated reactor gas quantity exceeds the quantity capable of being utilized in a combustion chamber of the highest pressure stage, the reactor gas is introduced into a combustion chamber of a next lower pressure stage. In this way, the generated reactor gas is always introduced at maximum pressure into the working medium of the gas turbine process, and, under given boundary conditions, this leads to maximum utilization of the enthalpy flows.

List of Reference Symbols 1 Gas turbine set
2 Waste-heat boiler
3 Additional firing
11 Compressor
12 Combustion chamber of the highest pressure stage
13 Turbine
14 Combustion chamber of a lower pressure stage
15 Turbine
16 Generator
18 Adjustable compressor blading, preguide row
19 Shaft
21 Steam generator and steam superheater
22 Reactor
23 Tapped-steam line
41 Controlling member
42 Controlling member
43 Controlling member
44 Controlling member
45 Controlling member
46 Controlling member
47 Controlling member
48 Controlling member
49 Additional-air flap
51 Feed water
52 Steam
53 Crude fuel to the reactor
54 Crude fuel to the additional firing
55 Reactor gas
56 Crude fuel to the combustion chamber of the lower pressure stage
57 Crude fuel to the combustion chamber of the highest pressure stage
58 Tapped-steam quantity
61 Sucked-in ambient air
62 Compressed combustion air
63 Hot gas
64 Partially expanded hot gas
65 Reheated hot gas
66 Exhaust gas, expanded working medium
67 Cooled exhaust gas
68 Additional air
101 Feed water pump
102 Reservoir
103 Additional-air blower

What is claimed is:

1. A method for operating a power plant, said method comprising the steps of:

compressing an air flow in at least one compressor;

feeding said compressed air into a first combustion chamber of a high pressure stage;

mixing and burning a first fuel amount in the compressed air inside the first combustion chamber, thereby generating a hot compressed gas;

partially expanding said hot compressed gas in a first turbine;

feeding the partially expanded gas into at least one sequentially arranged pair of second combustion chamber and second turbine of subsequently lower pressure stages;

mixing and burning a further fuel amount in the partially expanded gas inside the at least one second combustion chamber, thereby reheating the partially expanded gas;

further expanding the reheated gas to a lower pressure stage in the at least one second turbine;

leading the expanded hot gas after expansion in a last second turbine of the at least one sequentially arranged pair of second combustion chamber and second turbine through a first flow path of a reactor and a heat recovery steam generator;

generating a steam flow in the heat recovery steam generator;

feeding said steam flow into a second flow path of the reactor;

feeding a flow of unreformed hydrocarbon-containing fuel into the reactor;

conducting a mixture of steam and said unreformed fuel through the reactor, thereby generating a flow of reactor product, said product comprising one of a reformed fuel, a mixture of reformed fuel and steam, or a mixture of reformed fuel, unreformed fuel and steam;

feeding the full flow of said reactor product into the first combustion chamber and using it as the first fuel amount; and feeding unreformed fuel to the at least one second combustion chamber as a further fuel.

2. The method of claim 1, further comprising the step of feeding a surplus fuel demand of the first combustion chamber which exceeds the reactor product production rate directly with unreformed fuel.

3. The method of claim 1, further comprising the step of feeding a surplus of reactor product, which exceeds a demand for fuel in the first combustion chamber into a second combustion chamber of the next lower pressure stage, thereby partly replacing unreformed fuel as a further fuel.

4. The method of claim 3, further comprising the step of feeding a surplus of reactor product, which exceeds the demand for fuel of the second combustion chamber of any pressure stage, into the second combustion chamber of the next lower pressure stage, thereby partly replacing unreformed fuel as a further fuel.

5. The method of claim 1, further comprising the step of controlling the ratio of the steam flow fed into the reactor to the unreformed fuel flow fed into the reactor such that the temperature of the gas upon exit from the heat recovery steam generator corresponds to a preset value.

6. The method of claim 1, further comprising the steps of controlling a feedwater flow to the heat recovery steam generator to meet a preset target value of the gas temperature upon exit from the heat recovery steam generator; controlling the steam quantity which is fed to the reactor such that the reactor production rate corresponds to the demand of the first combustion chamber; and extracting a surplus steam quantity from the heat recovery steam generator.

7. The method of claim 1, further comprising the step of controlling at least one row of adjustable compressor guide vanes during part load operation to substantially meet a maximum admissible temperature of the expanded hot gas upon exit from the last second turbine.

8. The method of claim 1, further comprising the step of heating the expanded hot gas in a controlled manner by means of a supplemental firing to meet the required composition and production rate of the reactor product.

9. The method of claim 8, further including the step of operating the supplemental firing upon startup of the power plant.

10. The method of claim 8, further comprising the step of controlling the supplemental firing to meet a preset value of the reactor temperature.

\* \* \* \* \*